United States Patent
Shia et al.

(10) Patent No.: US 7,961,380 B2
(45) Date of Patent: Jun. 14, 2011

(54) FAST POWER TRANSIENT SUPRESSION IN CONSTANT POWER-MODE CONTROLLED OPTICAL AMPLIFIERS

(75) Inventors: Brian Shia, Horseheads, NY (US); Douglas Llewellyn Butler, Painted Post, NY (US); Martin Williams, Corning, NY (US)

(73) Assignee: Oclaro North America, San Jose, CA (US)

( * ) Notice: Subject to any disclaimer, the term of this patent is extended or adjusted under 35 U.S.C. 154(b) by 419 days.

(21) Appl. No.: 12/070,523

(22) Filed: Feb. 19, 2008

(65) Prior Publication Data
US 2009/0207484 A1    Aug. 20, 2009

(51) Int. Cl.
*H04B 10/17*    (2006.01)
*H04B 10/12*    (2006.01)

(52) U.S. Cl. .......... 359/341.42; 359/341.41; 359/341.43

(58) Field of Classification Search ............. 359/341.41, 359/341.42, 341.43
See application file for complete search history.

(56) References Cited

U.S. PATENT DOCUMENTS

| | | | | |
|---|---|---|---|---|
| 5,812,710 | A | * | 9/1998 | Sugaya ........................ 385/27 |
| 6,025,947 | A | * | 2/2000 | Sugaya et al. ................ 398/97 |
| 6,173,106 | B1 | * | 1/2001 | DeBoynton et al. ......... 385/140 |
| 6,288,836 | B1 | * | 9/2001 | Kawasaki et al. ........ 359/341.42 |
| 6,535,330 | B1 | * | 3/2003 | Lelic et al. .............. 359/337.13 |
| 2002/0001124 | A1 | * | 1/2002 | Kinoshita et al. .......... 359/337.1 |
| 2002/0075562 | A1 | * | 6/2002 | Youn et al. ............... 359/341.41 |

* cited by examiner

*Primary Examiner* — Eric Bolda
(74) *Attorney, Agent, or Firm* — Peter V. D. Wilde

(57) ABSTRACT

The specification describes an improved approach to suppressing fast transients in optical amplifier systems. The approach relies on operating the amplifier in an automatic power-mode control with an extra loss component. It is applicable to optical amplifiers based on rare earth amplifier media, such as erbium doped fiber amplifiers (EDFAs).

11 Claims, 3 Drawing Sheets

FAST POWER TRANSIENT SUPRESSION IN CONSTANT POWER-MODE CONTROLLED OPTICAL AMPLIFIERS

FIELD OF THE INVENTION

The field of the invention is optical amplifiers. More specifically the invention is directed to methods and systems for controlling optical power transients in constant power-mode erbium-doped fiber amplifiers (EDFAs).

BACKGROUND OF THE INVENTION

Constant power-mode optical amplifiers are becoming increasingly important as high bit-rate (>10 Gbps), reconfigurable optical transmission systems with complex networking architectures, including reconfigurable optical add/drop multiplexers (ROADM), become more popular. The addition of such ROADM components adds loss and increases the need for terminal-EDFAs immediately preceding receivers beyond the more traditional in-line EDFA's as shown in FIG. 1. High bit-rates (40 Gbps and greater) have more stringent optical signal to noise ratio (OSNR) requirements than low bit-rates and also require the deployment of per-channel tunable dispersion compensators as shown in FIG. 1, further increasing the need for terminal-EDFA's. Due to dynamic channel add/drop events from the aforementioned increasing use of ROADMs, the input power levels to terminal-EDFAs can vary in a big range. Transient overshoots at the terminal-EDFA output resulting from a sudden input power surge can cause irreparable damage to the receiver. This receiver input power limit serves to lower the maximum acceptable output power of terminal EDFA's while the Optical Signal to Noise Ratio (OSNR) constraint from high bit-rate serves to raise the minimum acceptable output power of the terminal EDFA. Hence, fast overshoot suppression is a useful feature in constant power-mode EDFAs. The OSNR requirements typically prevent users from simply operating the terminal-EDFAs at output power levels low enough to permit the application of conventional constant gain-mode EDFA control techniques.

Although constant-gain controlled EDFAs, wherein the inherent gain drift of the amplifier is compensated by adjustments in the pump power, are widely deployed, very fast constant-power controlled EDFAs present a different challenge, and solutions are still being sought. Simple and low-cost solutions are always desirable but challenging. A key problem is to suppress the output power surge that results from an input power transient in a short enough time to ensure that the integrated energy hitting a photodetector is substantially less than that required to cause overload or damage. If any EDFA is added upstream of a PIN photodetector it is important to suppress power transients to avoid overload or damage to the photodetector.

One approach to addressing this problem is described in U.S. Pat. No. 6,757,099. The solution described in this patent involves the use of a feedfoward and feedback control algorithm to do the power transient suppression. However, this method does not provide sufficiently fast response to very fast transient rise times.

Another approach is described in U.S. Pat. No. 5,187,610, which describes the use of a lumped loss element at the output of an EDFA to increase the noise figure of merit. However, it is not evident that this solution adequately addresses issues of fast transient performance.

Known prior art transient control schemes operate in some fashion by raising and lowering the pump power in response to a change of the input power. These are limited by the characteristic response time of the gain medium.

Thus there is a need for improvements in the suppression of fast input power transients.

STATEMENT OF THE INVENTION

We have developed an improved approach to suppressing fast transients in constant power-mode optical amplifiers. The approach relies on operating the amplifier in an automatic power control mode. It is applicable to optical amplifiers based on rare earth amplifier media, such as erbium doped fiber amplifiers (EDFAs).

BRIEF DESCRIPTION OF THE DRAWING

The invention may be better understood when considered in conjunction with the drawing in which.

DETAILED DESCRIPTION OF THE INVENTION

Figure 1:
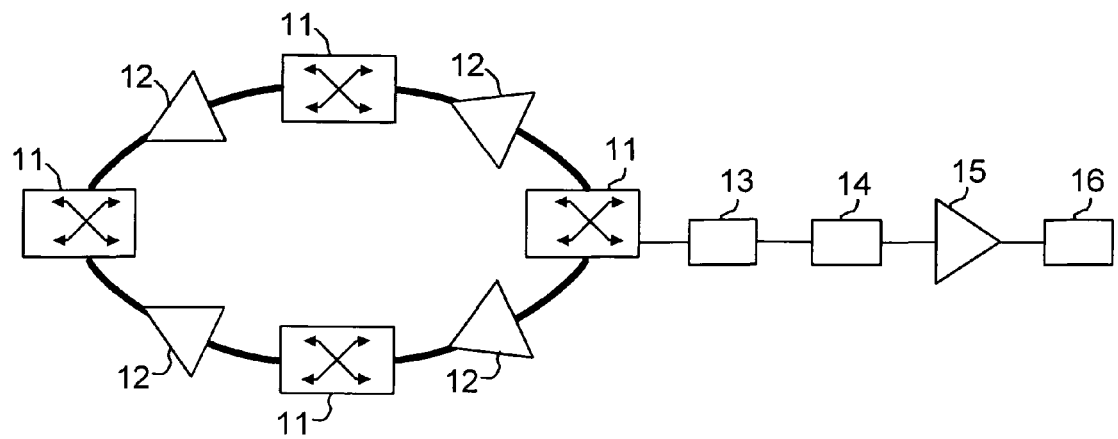
FIG. 1 is a functional diagram of a typical EDFA with reconfigurable optical add/drop multiplexers.

The operation of typical optical fiber amplifiers relies on a gain medium in which rare earth ions are pumped to an inverted state, and then decay to a ground sate by the stimulated emission by the signal wavelength or spontaneous emission. In a constant power-mode EDFA, when the input power increases, the signal gain must decrease in order to keep the output power constant. The decrease of gain is normally achieved by decreasing the population inversion by controlling the pump driving current. However, the decrease of population inversion is not very fast due to the long decay time of the gain medium (erbium in this case). Therefore, shortening the decay time is important to control and suppress the overshoot in the power transient events in constant power-mode EDFAs. It has been discovered that the decay time becomes shorter if the signal power inside the gain medium can be pushed to a higher level FIG. 1 illustrates an in-line EDFA with reconfigurable optical add/drop multiplexers 11 and associated amplifiers 12. Such systems typically include bandpass filter 13, and various compensator elements 14 such as tunable dispersion compensators and /polarization mode compensators. The EDFA output amplifier/receiver is shown at 15, 16.

Figure 2:
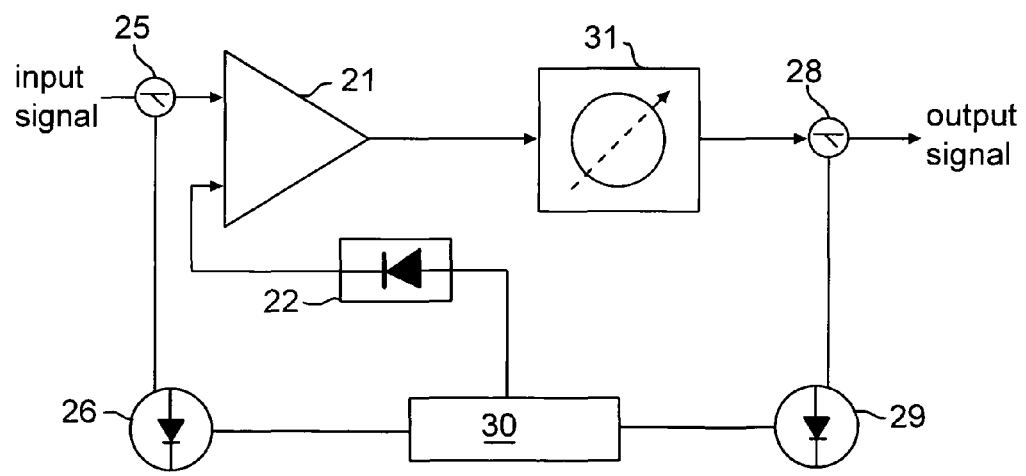
FIG. 2 is a schematic circuit diagram of a circuit useful for implementing the invention.

FIG. 2 shows the basic elements of an amplifier operating according to the invention. The input signal is introduced into EDFA amplifier medium 21. The input signal typically has wavelengths around 1550 nm. The EDFA is optically pumped with pump laser 22 operating typically at 980 nm. The typical EDFA is a length of optical fiber with the core doped with Ge and Er. Other details of the structure and operation of the EDFA are well known and need not be described in detail here.

The EDFA according to the invention is operated with an automatic power control system. The power of both the input signal and the signal at the amplifier output is measured. The power data is fed to a controller that adjusts the amplifier pump power to produce an output signal meeting a power level specification.

FIG. 2 shows an optical tap 25 for sampling the input signal. The power level of the input signal is measured by photodetector 26. Likewise optical tap 28 samples the amplifier output signal, and the power level of the amplifier output signal is measured by photodetector 29. The photodetectors are typically semiconductor photodetectors but can be any suitable electro-optic device for measuring optical power. Preferred detectors are PIN photodiodes. The measurement data is processed by controller 30 to adjust, as needed, the pump power at optical pump 22. This is an example of an automatic power control system. Other system options for automatically controlling the output power of the EDFA may be used. These are described as operating in an automatic gain/power control mode. Automatic gain/power systems that are useful in the invention are characterized as those that use a sample of the amplifier output for the optical pump control mechanism. These are defined by the term amplifier output signal controlled gain/power control systems and are operated in an amplifier output signal controlled gain/power control mode.

According to the invention, an optical attenuator 31 is inserted at the output of the EDFA. The optical attenuator may be a variable optical attenuator, an optical coupler, an optical splitter or tap, a lossy connector, or any other means for reducing the power of the signal at the amplifier output. Generically this element is referred to as an optical attenuator and is defined as any element that significantly reduces the power level at the output of the amplifier, e.g., reduces the power level by at least 10%. Adjustable loss elements, such as variable optical attenuators, may be preferred in cases where variable EDFA output power is required with the same power transient performance.

The invention was demonstrated using a 30/70 optical coupler as the optical attenuator element, with the signal in the 30 coupler output. This is an example of a fixed value optical attenuator. The power coupled into the 70 side of the coupler is discarded, resulting in a signal attenuation of approximately 70% (5.3 dB). The effect of the optical attenuator is to deceive the photodiode sensor 29 into artificially causing an adjustment in the pump power to elevate the inversion state of the amplifier. That causes the actual signal power to be very high in the gain medium, which can effectively speed up decay time when the input power increases in a short time.

Figure 3A:
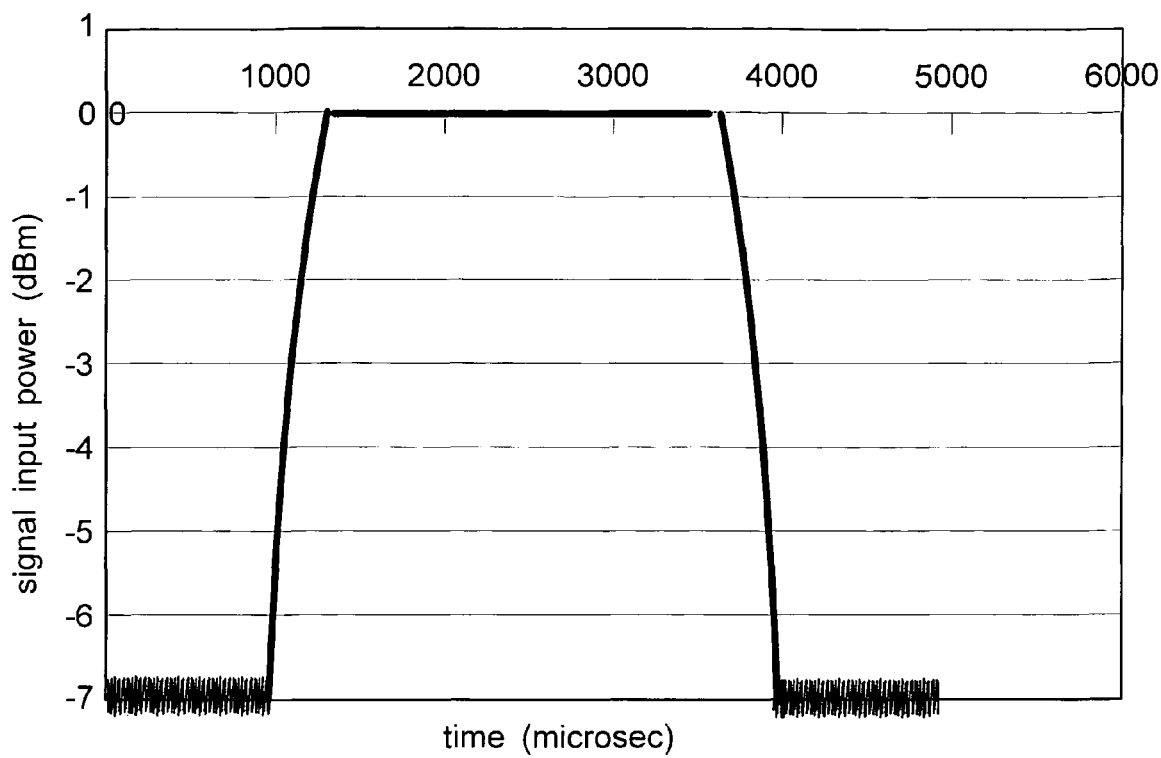
FIGS. 3a and 4a are plots of signal power input vs. time for a 50 microsecond rise/fall power transient.
Figure 3B:
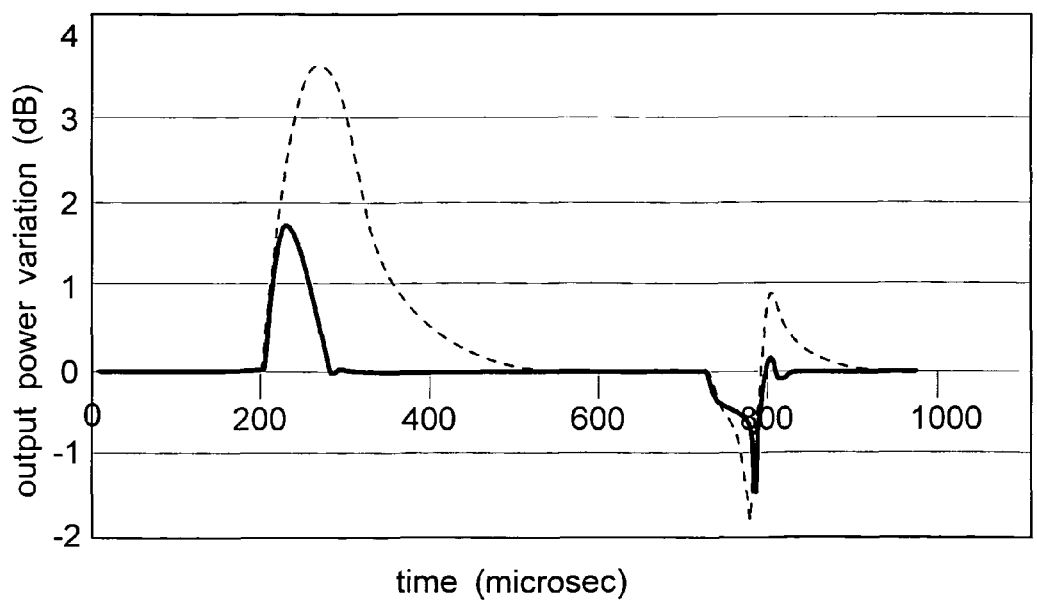
FIGS. 3b and 4b are plots showing signal power output with and without the circuit modification of the invention.
Figure 4A:
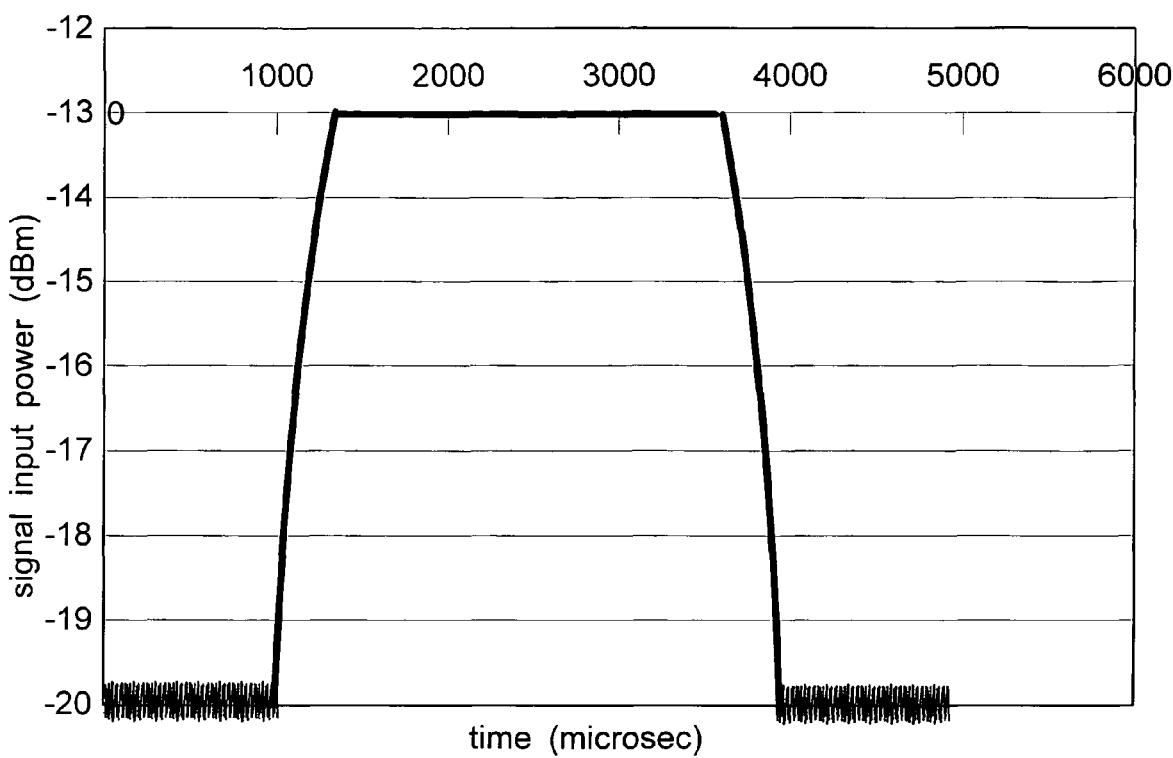
Figure 4B:
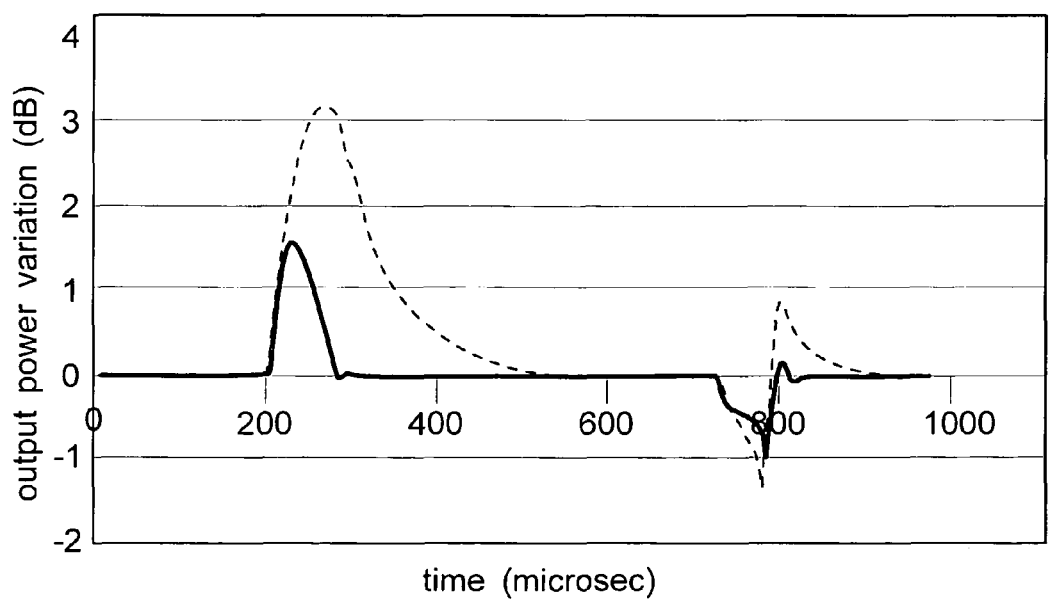

To demonstrate the effectiveness of the invention, fast transient response using the circuit of FIG. 2 was compared with and without an optical attenuator element. The performance improvement is shown in FIGS. 3a and 3b, and 4a and 4b. FIG. 3a shows a very short transient, i.e. 50 µsec, in a −7 dB input signal operating between 0 and −7 dB, and FIG. 4a shows a similar fast transient in an input signal operating between −13 dB and −20 dB. FIGS. 3b and 4b show the variation in the output signal as a consequence of the fast transients of FIGS. 3a and 4a.

The dashed curve in each of FIGS. 3b and 4b shows the result of operating the amplifier circuit without an optical attenuator element. Due to the slow response to the fast transient of FIGS. 3a and 4a, the microcontroller causes an overshoot in the output power of the amplifier of more than 3 dB.

The solid curve in these figures shows the result of operating the amplifier circuit with an optical attenuator inserted at the amplifier output as shown in FIG. 2. The improvement in performance is evident. FIG. 3b shows a 3.5 db overshoot without the optical attenuator element of the invention, which is reduced to 1.7 dB using the optical attenuator element of the invention. Similarly, FIG. 4b shows a 3.1 dB overshoot without the optical attenuator, but only a 1.5 dB overshoot with the optical attenuator. These results demonstrate a dramatic improvement in fast transient response.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Method for amplifying an optical signal in a rare-earth-doped fiber amplifier (REDFA), the REDFA comprising an amplifying medium and an optical pump for pumping the amplifying medium, the optical pump control operating in a constant power control mode, where a first pump power level is capable of producing the constant power control mode, the method comprising the sequential steps of:
   (a) directing an input optical signal through the amplifying medium,
   (b) optically pumping the amplifying medium with the optical pump to produce an amplifier output signal,
   (c) attenuating the amplifier output signal using a fixed value optical attenuator with an attenuation of at least 10% to produce an attenuated amplifier output signal,
   (d) feeding back a portion of the attenuated amplifier output signal to the optical pump control causing an adjustment in the optical pump power to elevate the pump power level to achieve the constant power control mode.

2. Method of claim 1 wherein the attenuated amplifier output signal is tapped to produce an output control signal, and the output control signal is connected to the input of a photodetector to produce a first optical pump control signal.

3. The method of claim 2 wherein the first control signal is connected to the optical pump control.

4. Method of claim 3 wherein the input optical signal is tapped to produce an input control signal, and the input control signal is connected to the input of a photodetector to produce a second optical pump control signal.

5. The method of claim 4 wherein the second control signal is connected to the optical pump control.

6. The method of claim 5 wherein the REDFA is an EFDA.

7. The method of claim 1 wherein the fixed value optical attenuator is an optical coupler with the amplifier output signal in one output of the optical coupler and the other output is discarded.

8. A rare-earth-doped fiber amplifier (REDFA) device comprising an amplifying medium and an optical pump for pumping the amplifying medium:

(a) an input optical signal connected to the amplifying medium, (b) an optical pump for pumping the amplifying medium to produce an amplifier output signal, (c) an optical pump control for controlling the optical pump, (d) a first tap for tapping a portion of the amplifier output signal, (e) a first photodetector having an input and an output, the input of the first photodetector connected to the first tap and the output of the first photodetector connected to the optical pump control, (f) a fixed value optical attenuator with an attenuation of at least 10% connected between the amplifying medium and the first tap.

9. The REDFA device of claim 8 further including:

(g) a second tap for tapping a portion of the optical input signal, (h) a second photodetector having an input and an output, the input of the second photodetector connected to the second tap and the output of the second photodetector connected to the optical pump control.

10. The REDFA device of claim 9 wherein the REDFA is an EFDA.

11. The REDFA device of claim 8 wherein the optical attenuator is an optical coupler with the amplifier output signal in one output of the optical coupler and the other output discarded.

* * * * *